United States Patent
Van Der Vleuten

(10) Patent No.: US 10,728,560 B2
(45) Date of Patent: Jul. 28, 2020

(54) ENCODING AND DECODING HDR VIDEOS

(71) Applicant: KONINKLIJKE PHILIPS N.V., Eindhoven (NL)

(72) Inventor: Renatus Josephus Van Der Vleuten, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/071,929

(22) PCT Filed: Jan. 27, 2017

(86) PCT No.: PCT/EP2017/051852
§ 371 (c)(1),
(2) Date: Jul. 23, 2018

(87) PCT Pub. No.: WO2017/129793
PCT Pub. Date: Aug. 3, 2017

(65) Prior Publication Data
US 2019/0082186 A1    Mar. 14, 2019

(30) Foreign Application Priority Data
Jan. 28, 2016 (EP) ..................... 16153061

(51) Int. Cl.
*H04N 19/186* (2014.01)
*H04N 19/80* (2014.01)
(Continued)

(52) U.S. Cl.
CPC ........... *H04N 19/186* (2014.11); *G09G 5/02* (2013.01); *G09G 5/10* (2013.01); *H04N 5/20* (2013.01);
(Continued)

(58) Field of Classification Search
None
See application file for complete search history.

(56) References Cited

U.S. PATENT DOCUMENTS

2009/0208099 A1    8/2009  Yoshii et al.
2015/0237322 A1*   8/2015  Stec ................ H04N 9/77
                                                    348/453
(Continued)

FOREIGN PATENT DOCUMENTS

EP        1720358 A2    11/2006
WO     2014009844 A1     1/2014
(Continued)

OTHER PUBLICATIONS

Goris, R. et al., "Philips response to CfE for HDR and WCG", International Organization for Standardisation, Coding of Moving Pictures and Audio, Jul. 2015, Poland (Year: 2015).*
(Continued)

*Primary Examiner* — Stuart D Bennett

(57) ABSTRACT

A video encoder and decoder system includes a video decoder (220) converting in input HDR images in a luma and chrominance representation to SDR images in a luma and subsampled chrominance representation by directly applying dynamic range conversion gains in the luma and subsampled chrominance domain. An video encoder may perform the opposite operation and convert from SDR to HDR by directly applying dynamic range conversion gains in the luma and subsampled chrominance domain.

9 Claims, 6 Drawing Sheets

(51) Int. Cl.

| | |
|---|---|
| *H04N 19/85* | (2014.01) |
| *G09G 5/02* | (2006.01) |
| *H04N 19/86* | (2014.01) |
| *H04N 5/20* | (2006.01) |
| *H04N 9/67* | (2006.01) |
| *H04N 9/68* | (2006.01) |
| *H04N 19/117* | (2014.01) |
| *H04N 19/59* | (2014.01) |
| *G09G 5/10* | (2006.01) |
| *H04N 19/182* | (2014.01) |
| *H04N 19/98* | (2014.01) |

(52) U.S. Cl.
CPC ............... *H04N 9/67* (2013.01); *H04N 9/68* (2013.01); *H04N 19/117* (2014.11); *H04N 19/182* (2014.11); *H04N 19/59* (2014.11); *H04N 19/80* (2014.11); *H04N 19/85* (2014.11); *H04N 19/86* (2014.11); *H04N 19/98* (2014.11); *G09G 2340/0428* (2013.01)

(56) References Cited

U.S. PATENT DOCUMENTS

| | | | |
|---|---|---|---|
| 2017/0026646 A1* | 1/2017 | Minoo | H04N 19/124 |
| 2017/0064334 A1* | 3/2017 | Minoo | H04N 19/60 |
| 2017/0223366 A1* | 8/2017 | Lopez | H04N 19/117 |

FOREIGN PATENT DOCUMENTS

| | | |
|---|---|---|
| WO | 2014056679 A1 | 4/2014 |
| WO | 2015007505 A1 | 1/2015 |

OTHER PUBLICATIONS

Goris, R. et al., "Philips response to CfE for HDR and WCG", International Organisation for Standardisation, Coding of Moving Pictures and Audio, Jul. 2015, Poland.

Tourapis, A. et al., "On 4:4:4 to 4:2:0 conversion—Performance of downsampling and upsampling filters, and MinMax and Closed Loop Filtering", JCT-VC Meeting, 2015 Warsaw.

"High Dynamic Range Electro-Optical Transfer Function of Mastering Reference Displays SMPTE ST 2084:2014", Aug. 2014, URL:http://ieeexplore.ieee.org/stamp/stamp.jsp?tp=&arnumber=7291452.

De Haan, W. et al., "HDR CE6: Core Experiments 4.3 and 4.6a: Description of the Philips CE system in 4:2:0 and with automatic reshaper parameter derivation", 23. JCT-VC Meeting, 2016, San Diego.

Lasserre, S. et al., "Technicolor's response to CfE for HDR and WCG (category 1)—Single layer HDR video coding with SDR backward compatibility", International Organisation for Standardisation, Coding of Moving Pictures and Audio, Jun. 2015, Warsaw, Poland.

Thoma, H. et al., "On chroma subsampling for HDR video", International Organisation for Standardisation, Coding of Moving Pictures and Audio, Jan. 2014, San Jose.

ITU-T, "H.265 : High efficiency video coding," Apr. 2015. [Online]. Available: https://www.itu.int/rec/T-REC-H.265.

ITU-R, "BT.2020 : Parameter values for ultra-high definition television systems for production and international programme exchange," Oct. 2015. [Online]. Available: https://www.itu.int/rec/R-REC-BT.2020/en.

ITU-R, "Recommendation ITU-R BT.1886 (Mar. 2011)," Mar. 2011. [Online]. Available: https://www.itu.int/dms_pubrec/itu-r/rec/bt/R-REC-B.1886-0-201103-I!!PDF-E.pdf.

\* cited by examiner

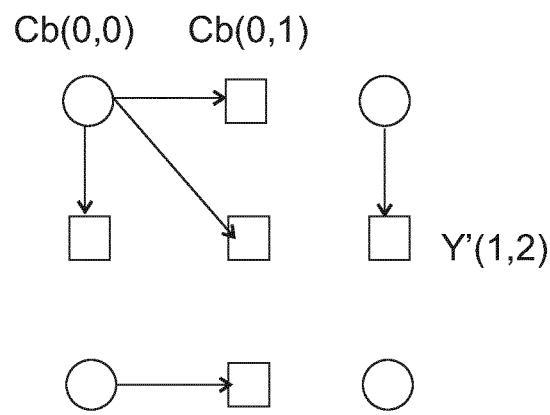
Fig. 6A
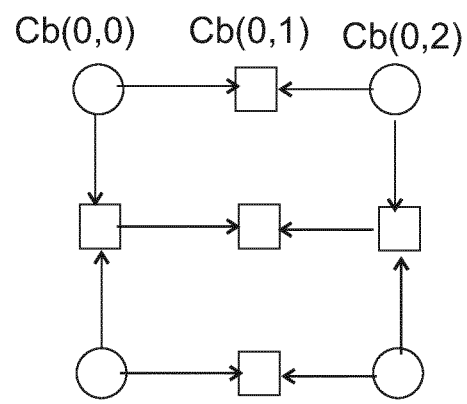
Fig. 6B
Fig. 6

ENCODING AND DECODING HDR VIDEOS

CROSS-REFERENCE TO PRIOR APPLICATIONS

This application is the U.S. National Phase application under 35 U.S.C. § 371 of International Application No. PCT/EP2017/051852, filed on 27 Jan. 2017, which claims the benefit of European Patent Application No. 16153061.3, filed on 28 Jan. 2016. These applications are hereby incorporated by reference herein.

FIELD OF THE INVENTION

The invention relates to methods and apparatuses for encoding respectively decoding a temporally successive set of high dynamic range images, called herein a HDR video.

BACKGROUND OF THE INVENTION

Until a couple of years ago, all video was encoded according to the so-called low dynamic range (LDR) philosophy, also called standard dynamic range (SDR). That meant, whatever the captured scene was, that the maximum of the code (typically 8 bit luma Y'=255; or 100% voltage for analog display driving) should by standardized definition correspond to, i.e. be rendered on, a display with a peak brightness PB (i.e. the brightest white color it can render) being by standard agreement 100 nit. If people bought an actual display which was a little darker or brighter, it was assumed that the viewer's visual system would adapt so that the image would still look appropriate and even the same as on the reference 100 nit display, rather than e.g. annoyingly too bright (in case one has e.g. a night scene in a horror movie which should have a dark look).

Of course, for practical program making this typically meant maintaining a tight control of the scene lighting setup, since even in perfectly uniform lighting the diffuse reflection percentage of various objects can already give a contrast ratio of 100:1. The black of such a SDR display may typically be 0.1 nit in good circumstances, yet 1 nit or even several nits in worst circumstances, so the SDR display dynamic range (the brightest white divided by the darkest viewable black) would be 1000:1 at best, or worse, which corresponds nicely to such uniform illuminated scenes, and an 8 bit coding for all the required to be rendered pixel grey values or brightnesses, having a gamma of approximately 2.0, or encoding inverse gamma 0.5. Rec. 709 was the typically used SDR video coding. Typically also cameras had problems capturing simultaneously both very bright and rather dark regions, i.e. a scene as seen outside a window or car window would typically be clipped to white (giving red, green and blue additive color components R=G=B=max., corresponding to their square root coded values R'=G'=B'=255). Note that if in this application a dynamic range is specified firstmost with a peak brightness (i.e. the brightest rendered or renderable luminance) only, we assume that the lowest luminance value is pragmatically zero (whereas in practice it may depend on viewing conditions such as display front plate or cinema screen light reflection, e.g. 0.1 nit), and that those further details are irrelevant for the particular explanation. Note also that there are several ways to define a dynamic range, and that the most natural one typically used in the below explanations is a display rendered luminance dynamic range, i.e. the luminance of the brightest color versus the darkest one.

Note also, something which has become clearer during the HDR research, and is mentioned here to make sure everybody understands it, that a code system itself does not natively have a dynamic range, unless one associates a reference display with it, which states that e.g. R'=G'=B'=Y'=255 should correspond with a PB of 100 nit, or alternatively 1000 nit, etc. In particular, contrary to what is usually pre-assumed, the number of bits used for the color components of pixels, like their lumas, is not a good indicator of dynamic range, since e.g. a 10 bit coding system may encode either a HDR video, or an SDR video, determined on the type of encoding, and in particular the electro-optical transfer function EOTF of the reference display associated with the coding, i.e. defining the relationship between the luma codes [0, 1023] and the corresponding luminances of the pixels, as they need to be rendered on a display.

In this text it is assumed that when a HDR image or video is mentioned, it has a corresponding peak brightness or maximum luminance for the highest luma code (or equivalently highest R', G', B' values in case of an RGB coding e.g. rather than an YCbCr encoding) which is higher than the SDR value of 100 nit, typically at least 4× higher, i.e. the to be rendered maximum display luminance for having the HDR image look optimal may be e.g. 1000 nit, 5000 nit, or 10000 nit (note that this should not be confused with the prima facie complex concept which will be detailed below that one can encode such a HDR image or video as a SDR image or video, in which case the image is both renderable on a 100 nit display, but importantly, also contains all information—when having corresponding associated metadata encoding a color transformation for recovering the HDR image—for creating a HDR image with a PB of e.g. 1000 nit!).

So a high dynamic range coding of a high dynamic range image is capable of encoding images with to be rendered luminances of e.g. up to 1000 nit, to be able to display-render good quality HDR, with e.g. bright explosions compared to the surrounding rendered scene, or sparkling shiny metal surfaces, etc.

In practice, there are scenes in the world which can have very high dynamic range (e.g. an indoors capturing with objects as dark as 1 nit, whilst simultaneously seeing through the window outside sunlit objects with luminances above 10,000 nit, giving a 10000:1 dynamic range, which is 10× larger than a 1000:1 DR, and even 100 times larger than a 100:1 dynamic range, and e.g. TV viewing may have a DR of less than 30:1 in some typical situations, e.g. daylight viewing). Since displays are becoming better (a couple of times brighter PB than 100 nit, with 1000 nit currently appearing, and several thousands of nits PB being envisaged), a goal is to be able to render these images beautifully, and although not exactly identical to the original because of such factor like different viewing conditions, at least very natural, or at least pleasing. And this needs what was missing in the SDR video coding era: a good pragmatic HDR video coding technology.

The reader should also understand that because a viewer is typically watching the content in a different situation (e.g. sitting in a weakly lit living room at night, or in a dark home or cinema theatre, instead of actually standing in the captured bright African landscape), there is no identity between the luminances in the scene and those finally rendered on the TV (or other display). This can be handled inter alia by having a human color grader manually decide about the optimal colors on the available coding DR, i.e. of the associated reference display, e.g. by prescribing that the sun in the scene should be rendered in the image at 5000 nit (rather than its actual value of 1 billion nit). Alternatively, automatic algorithms may do such a conversion from e.g. a raw camera capturing to what in the text will be (generically) called a (master) HDR grading. This means one can then render this master grading on a 5000 nit PB HDR display, at those locations where it is available.

At the same time however, there will for the coming years be a large installed base of people having a legacy SDR display of 100 nit PB, or some display which cannot make 5000 nit white, e.g. because it is portable, and those people need to be able to see the HDR movie too. So there needs to be some mechanism to convert from a 5000 nit HDR to a 100 nit SDR look image of the same scene.

FIG. 1 shows a couple of illustrative examples of the many possible HDR scenes a HDR system of the future (e.g. connected to a 1000 nit PB display) may need to be able to correctly handle, i.e. by rendering the appropriate luminances for all objects/pixels in the image. E.g. ImSCN1 is a sunny outdoors image from a western movie, whereas ImSCN2 is a nighttime image. What makes HDR image rendering different from how it always was in the LDR era which ended only a couple of years ago, is that the LDR had such a limited dynamic range (about PB=100 nit, and black level+−0.1 to 1 nit), that mostly only the reflectivities of the objects could be shown (which would fall between 90% for good white and 1% for good black). So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. So one had to conventionally color the night scenes blue, so that the viewer would understand he was not looking at a daytime scene. Now of course in real life human vision would also adapt to the available amount of light, but not that much (most people in real life recognize that it's getting dark). So one would like to render the images with all the spectacular local lighting effects that one can artistically design in it, to get much more realistic rendered images at least if one has a HDR display available.

So on the left axis of FIG. 1 are object luminances as one would like to see them in a 5000 nit PB master HDR grading for a 5000 nit PB display. If one wants to convey not just an illusion, but a real sense of the cowboy being in a bright sunlit environment, one must specify and render those pixel luminances sufficiently bright (though also not too bright), around e.g. 500 nit. For the night scene one wants mostly dark luminances, but the main character on the motorcycle should be well-recognizable i.e. not too dark (e.g. around 5 nit), and at the same time there can be pixels of quite high luminance, e.g. of the street lights, e.g. around 3000 nit on a 5000 nit display, or around the peak brightness on any HDR display (e.g. 1000 nit). The third example ImSCN3 shows what is now also possible on HDR displays: one can simultaneously render both very bright and very dark pixels. We see a dark cave, with a small opening through which we see the sunny outside. For this scene one may want to make the sunlit objects like the tree somewhat less bright than in a scene which wants to render the impression of a bright sunny landscape, e.g. around 400 nit, which should be more coordinated with the essentially dark character of the inside of the cave. A color grader may want to optimally coordinate the luminances of all objects, so that nothing looks inappropriately dark or bright and the contrast are good, e.g. the person standing in the dark in this cave may be coded in the master HDR graded image around 0.05 nit (assuming HDR renderings will not only be able to render bright highlights, but also dark regions).

It can be understood that it may not always be a trivial task to map all the object luminances for all these very different types of HDR scene to optimal luminances available in the much smaller SDR or LDR dynamic range (DR_1) shown on the right of FIG. 1, which is why preferably a human color grader may be involved for determining the color transformation (which comprises at least a luminance transformation, or luma transformation when equivalently performed on the luma codes). However, one can always choose to use automatically determined transformations, e.g. based on analyzing the color properties of the image content such as its luminance histogram, and this may e.g. be a preferred option for simpler kinds of HDR video, or applications where human grading is less preferred e.g. as in real-time content production (in this patent it is assumed that without limitation grading could also involve the quick setting of a few color transformation function parameters, e.g. for the whole production quickly prior to the start of capturing).

Applicant has designed a coding system, which not only can handle the communication (encoding) of merely a single standardized HDR video, for a typical single kind of display in the field (with every end viewer having e.g. a 1000 nit PB display), but which can at the same time communicate and handle the videos which have an optimal look for various possible other display types with various other peak brightnesses in the field, in particular the SDR image for a 100 nit PB SDR display.

Encoding only a set of HDR images, i.e. with the correct look i.e. image object luminances for a rendering on say a 1000 nit HDR monitor, in e.g. a 10 bit legacy MPEG or similar video coding technology is not that difficult. One only needs to establish an optimal OETF (opto-electronic transfer function) for the new type of image with considerably larger dynamic range, namely one which doesn't show banding in the many compared to white relatively dark regions, and then calculate the luma codes for all pixel/object luminances.

Applicant however designed a system which communicates HDR images as LDR images, i.e. actually LDR (or SDR, i.e. referred to a 100 nit PB reference display, and often optimally color graded on such a reference display) images are communicated, which then can already immediately be used for rendering the correctly looking SDR look on legacy 100 nit PB SDR displays. Thereto, a set of appropriate reversible color transformation functions F_ct is defined, as is illustrated with FIG. 2. These functions may be defined by a human color grader, to get a reasonably looking SDR image (Im_LDR) corresponding to the HDR master image MAST_HDR, whilst at the same time ensuring that by using the inverse functions IF_ct the original master HDR (MAST_HDR) image can be reconstructed with sufficient accuracy as a reconstructed HDR image (Im_RHDR), or, automatic analysis algorithms may be used at the content creation side for determining suitable such color transformation functions F_ct. Note that instead of relying on a receiving side to invert the functions F_ct into IF_ct, one can also send already the needed functions for calculating Im_RHDR from the received and decoded SDR image Im_RLDR. So what the color transformation functions actually do is change the luminances of the pixel in a HDR image (MAST_HDR) into LDR luminances, i.e. the optimal luminance compression as shown in FIG. 1 to fit all luminances in the 100 nit PB LDR dynamic range DR_1. Applicant has invented a method which can keep the chromaticities of the colors constant, effectively changing only their luminances, as will be elucidated below.

A typical coding chain as shown in FIG. 2 works as follows. Some image source 201, which may e.g. be a grading computer giving an optimally graded image, or a camera giving a HDR output image, delivers a master HDR image MAST_HDR, to be color transformed and encoded. A color transformer 202 applies a determined color transformation, e.g. a concave bending function, which for simplicity of elucidation we will assume to be a gamma function with coefficient gam=1/k and k a number larger than 2.0. Of course more complex luminance mapping functions may be employed, provided that they are sufficiently reversible, i.e. the Im_RHDR image has negligible or acceptable banding. By applying these color transformation functions F_ct comprising at least luminance transformation functions, an output image Im_LDR results. This image or set of images is encoded with a legacy LDR image encoder, which may potentially be modified somewhat, e.g. the quantization tables for the DCT-ed transformations of the prediction differences may have been optimized to be better suited for images with HDR characteristics (although the color transformations may typically already make the statistics of the Im_LDR look much more like a typical LDR image than a typical HDR image, which HDR image typically has relatively many pixels with relatively dark luminances, as the upper part of the range may often contain small lamps etc.). E.g., a MPEG-type encoder may be used like HEVC (H265), yielding an encoded SDR image Im_COD. This video encoder 203 then pretends it gets a normal SDR image, although it also gets the functions F_ct which allow the reconstruction of the master HDR image, i.e. effectively making this a dual co-encoding of both an SDR and a HDR look, and their corresponding set of images (Im_RLDR, respectively Im_RHDR). There may be several manners to communicate this metadata comprising all the information of the functions F_ct, e.g. they may be communicated as SEI messages. Then a transmission formatter 204 applies all the necessary transformations to format the data to go over some transmission medium 205 according to some standard, e.g. a satellite or cable or internet transmission, e.g. according to ATSC 3.0, i.e. packetization of the data is performed, channel encoding, etc. At any consumer or professional side, a receiver 206, which may be incorporated in various physical apparatuses like e.g. a settopbox, television or computer, undoes the channel encoding by applying unformatting and channel decoding. Then a video decoder 207 applies e.g. HEVC decoding, to yield a decoded LDR image Im_RLDR. Then a color transformer 208 is arranged to transform the SDR image to an image of any non-LDR dynamic range. E.g. the 5000 nit original master image Im_RHDR may be reconstructed by applying the inverse color transformations IF_ct of the color transformations F_ct used at the encoding side to make the Im_LDR from the MAST_HDR. A display tuning unit 209 may be comprised which transforms the SDR image Im_RLDR to a different dynamic range, e.g. Im3000 nit being optimally graded in case display 210 is a 3000 nit PB display, or a 1500 nit or 1000 nit PB image, etc.

FIG. 3 shows how one can design such a chromaticity-preserving luminance re-calculation, taken from WO2014056679. One can understand this processing when seen in the gamut normalized to 1.0 maximum relative luminance for both the SDR and the HDR image (i.e. assuming that the SDR and HDR have the same e.g. Rec. 2020 primaries, they have then exactly the same tent-shaped gamut; as shown in FIG. 1 of WO2014056679). If one were to drive any display with e.g. the cowboy having in the driving image a luma code corresponding to a luminance of 10% of peak brightness of the display, then that cowboy would render brighter the higher the PB of the display is. That may be undesirable, as we may want to render the cowboy with (approximately) the same luminance on all displays, e.g. 60 nit. Then of course his relative luminance (or the corresponding 10 bit luma code) should be lower the higher the PB of the display is, to get the same ultimate rendered luminance. I.e., one could represent such a desire as a downgrading mapping e.g. from luma code 800 for the SDR image, to e.g. luma code 100 for the HDR image (depending on the exact shape of the EOTF defining the codes which is used), or, in luminances one maps the 60% SDR luminance to e.g. $1/40^{th}$ of that for a 4000 nit HDR display or its corresponding optimally graded image. Downgrading in this text means changing the luma codes of the pixels (or their corresponding to be rendered luminances) from a representation of higher peak brightness (i.e. for rendering on a higher PB display, e.g. of 1000 nit PB) to the lumas of an image of the same scene in a lower PB image for rendering on a lower PB display, e.g. a 100 nit SDR display, and upgrading is the opposite color transformation for converting a lower PB image into a higher PB image, and one should not confuse this with the spatial upscaling and downscaling, which is adding new pixels respectively dropping some pixels or some color components of those pixels. One can do that for any color, in which a (RGB) triplet corresponds to some chromaticity (x,y) in the display or encoding code gamut, in a manner which will automatically scale to the maximum luminance available (renderable) for that chromaticity Lmax(x,y), by the apparatus of FIG. 3. Actually, one can demonstrate that this corresponds to applying a similar luminance mapping, which on the achromatic axis (i.e. of colors having no particular hue) which takes the input luminance L of the color in the SDR image, to the needed relative output luminance L* of the optimal HDR graded image. Without diving into details, what is relevant from this teaching, is that the corresponding color transformation can then be realized as a multiplicative transformation on the (preferably linear) RGB components, on each component separately, by a multiplier 311, with a constant g larger or smaller than 1.0, which corresponds to whatever shape of the luminance transformation function L_out=TM(L_in) one choses, which can also be formulated as a functional transformation of the maximum of the input red, green and blue color values of a pixel. So for each input color (R,G,B), the appropriate g-value is calculated for applying the desired color transformation which transforms Im_RLDR into Im_RHDR (or in an appropriately scaled manner into any other graded image, like Im3000nit), when luminance mapper 307 gets some SDR-luminance to HDR_luminance mapping function, e.g. a parametrically specified loggamma function or sigmoid, or a multilinear curve received as a LUT. The components of the exemplary embodiment circuit are: 305: maximum calculator, outputting the maximum one (maxRGB) of the R, G, and B values of a pixel color being processed; 301: luminance convertor, calculating the luminance of a color according to some color definition standard with which the system currently works, e.g. Rec. 2020; 302: divider, yielding Lmax(x,y) as L/max (R,G,B); 307 luminance mapper actually working as a mapper on maxRGB, yielding m*=TM(maxRGB), with TM some function which defines the luminance transformation part of F_ct; 308: a multiplier, yielding L*=(m*)×Lmax(x,y) and 310 a gain determination unit, being in this embodiment actually a divider, calculating g=L*/L, i.e. the output HDR relative luminance divided by the input SDR relative luminance L; and 311 is a multiplier arranged to multiply the three color components R,G,B with the same g factor.

This circuit may be appropriate for some color encodings. However, one would ideally like to work in typical SDR encodings as they are typically used. Im_LDR as it would come out of HEVC decoder 207, would typically be in a non-linear Y'CbCr encoding (wherein we can assume the non-linearity to be a square root approximately, i.e. ignoring the non-constant luminance issues then: Y'=sqrt(L) approximately). More of an issue for such novel SDR-communicated HDR video codings (or as explained above actually a set of gradings containing at least a SDR and a master HDR look) was the fact that in some situations the Cb and Cr coefficients may be sub-sampled spatially, e.g. in a 4:2:0 encoding. That was not really an issue in SDR, not just because any color errors wouldn't show up large on a 100 nit rendering, but also, because in the above explained technology, we have a color transformation for reconstructing the Im_RHDR (or the display tuned Im3000nit), which just doesn't exist in the SDR video coding paradigm. If one has the wrong RGB values (because one no longer has the full resolution correct RGB values per pixels at the decoding side), this leads to reading at the wrong place of the TM function, or in other words, getting the wrong g-factor in the decoder of FIG. 3. I.e., one might risk sometimes seriously incorrectly boosting or dimming the SDR color, e.g. at a boundary of an object, giving potentially visible artefacts, and no sufficiently accurate Im_RHDR reconstruction.

SUMMARY OF THE INVENTION

The closer approximating artifact-free reconstruction of the master HDR images can be obtained by agreeing to make some modifications to the decoder and corresponding encoder, and in particular by having a video decoder (220) arranged to decode and output a set of temporally successive high dynamic range images (Im_RHDR) from coded input images which are a set of encoded low dynamic range images (Im_COD) which are in a format wherein pixel colors are represented by luma values (Y'4L) and chrominance values (C'b0L, C'r0L), the chrominance values (C'b0L, C'r0L) being sub-sampled spatially compared to the luma values (Y'4L), the video decoder comprising:

a video decoder (207) arranged to decode the encoded low dynamic range images into uncoded low dynamic range images (Im_RLDR);

a first and second spatial upscaler (501, 502) arranged to upscale chrominance values of the low dynamic range images (Im_RLDR) to a resolution of the luma values;

a color convertor (503) arranged to, for each pixel of the low dynamic range images (Im_RLDR), convert the luma value and chrominance values into a non-linear R'G'B' representation (R'4, G'4, B'4) comprising three non-linear R'G'B' color values;

a maximum calculation unit (504) arranged to output, for each pixel, a maximum (m) of the three non-linear R'G'B' color values;

a luminance mapping unit (505) arranged to receive a luminance mapping function (TM) which defines a relationship between luminances or lumas of one of the low dynamic range input images (Im_RLDR) being processed to luminances respectively lumas of the corresponding high dynamic range output image (Im_RHDR) to be obtained, and arranged to, for each pixel, apply the luminance mapping function to the maximum (m), yielding an output maximum (m*);

a gain factor calculator (506) arranged to, for each pixel obtain a gain value (g) by dividing the output maximum (m*) by the maximum (m);

a first and second spatial downscaler (507, 508) arranged to spatially downscale the gain values to a resolution of the chrominance values of the low dynamic range images; and multipliers (509, 510, 511) arranged to, for each pixel, multiply the luma value and chrominance values (C'b0L, C'r0L) of the low dynamic range input image (Im_RLDR) being processed with the determined respective gain value (g), the respective gain values for the chrominance values being downscaled gain values.

The uncoded images will typically be in a known format, namely Y'CbCr, in which Y' is a luma which can be calculated from the non-linear R', G', B' coefficients, which without losing generality we assume to be the square root of the linear RGB coefficients. This is because such a format is what is typically used in video compressors which are DCT-based, i.e. similar to the MPEG-type video encoding like HEVC. The exact equations depend on the color definition used i.e. in particular its primaries. We assume that the advantageous Rec. 2020 is used for elucidation, in which case the relationships are: Y'=0.2627R'+0.6780G'+0.0593B' (which would in general be Y'=aR'+bG'+cB', with other values for a,b,c when e.g. a P3 RGB color system is used, or a Rec. 709., etc.);

$$Cb=(B'-Y')/1.8814$$

$$Cr=(R'-Y')/1.4746$$

We will elucidate only the example of 4:2:0 spatial sub-sampling or downscaling, in which the CbCr components have half the resolution of the lumas Y' in both the horizontal and vertical direction, i.e. the chrominance component images are ½*½ the size they would have in a 4:4:4 full resolution encoding, as the skilled person can understand how other sub-sampling situations would mutatis mutandis be handled, e.g. 4:2:2, etc.

A problem is that on the decoding/receiving side, the input images (which ultimately have to become full quality, i.e. full 4:4:4 resolution HDR images in case a HDR display needs to be supplied with images), and whereas upscaling would be as usual for LDR, this is not trivial when HDR images are needed, because the interplay between content encoded in the image and the colorimetric transformations, and because basically not all the information needed to do the color-dependent color transforms is present at the receiving end.

However, if one smartly designs the encoding-decoding technical scheme, one can reach a stable and high quality solution.

What is needed, is that the upscaler preferably does a good quality upscaling, but more importantly, an upscaling that at this place before establishing and performing of the color transformation to convert to the other dynamic range image, is the same in the encoder as the decoder uses. That guarantees that the functional color transforms generating the Im_LDR for the MAST_HDR, and the inverse one can be the same (though inverse), i.e. the MAST_HDR can be closely reconstructed as Im_RHDR. It will lead to the correct gain values in a 2D gain image to be applied, rather than potentially at some spatial locations in some scenarios incorrect gain values.

The appropriate brightness scaling can happen on any power function of the linear red, green and blue coefficients, e.g. a square root, or an additive or subtractive combination of two such components with the same power, but, to allow the property of staying within gamut, the evaluation of where the color resides in the gamut (i.e. e.g. safely halfway, or close to the top of the 3D color gamut, i.e. the maximally achievable brightness for that chromaticity) is in this technology done by working on the maximal one of the three non-linear red, green and blue color components (typically preferably defined with an OETF or code allocation power value of 0.5, as a pure power, i.e. R'=power(R,0.5) and the same for the other color components, in a full range normalized [0.0,1.0] representation of both R and R'). Instead of 0.5 e.g. 1/(2.4) or other values can be used too. The color transformation can then be formulated as a multiplicative strategy with a factor which we call gain factor, whereby the skilled reader should understand that if the gain factor is smaller than 1.0, e.g. 0.3, then we actually have a darkening of the relative luminance in the normalized color gamut. The other part is that the decoder now establishes the correct gain for each incoming Y'4L, C'b0L, C'r0L triplet, as it comes in. So each time there is a luma, it will get multiplied by its corresponding appropriate gain value, and each time a chrominance is available, it will also be multiplied by the correct gain value. This corresponds to having the correctly sub-sampled gain value images for each scenario, which means the SDR-to-HDR transformation can actually be directly applied on the sub-sampled incoming LDR image Im_RLDR in whatever format it is. Later upscaling would then occur in the same HDR representation, and be without particular issues again, e.g. a conversion to 4:4:4 R"G"B" representation defined with the SMPTE ST2084 inverse EOTF may be done.

The decoding of the encoded low dynamic range images may provide uncoded low dynamic range images in a format wherein pixel colors are represented by luma values and chrominance values, the chrominance values being sub-sampled spatially compared to the luma values. A pixel color may specifically be represented by one luma value and two chrominance values. The resolution of the luma values is typically the same as the pixel resolution of the low dynamic range images. The resolution of the chrominance values is lower than the resolution of the low dynamic range images, and thus typically lower than the pixel resolution of the low dynamic range images. A chrominance value may typically be common for a plurality of luma values/pixels of the low dynamic range images.

The high dynamic range images may similarly be in a format wherein pixel colors are represented by luma values and chrominance values.

A maximum m, output maximum m*, and gain value may be determined for each pixel of the (uncoded) low dynamic range images, and each pixel of the (uncoded) low dynamic range images may be multiplied by the corresponding gain value. The low dynamic range images may specifically refer to the uncoded low dynamic range images. The respective gain value for a given luma or chrominance value may be a gain value determined for the position of the value from the values determined by the gain factor calculator. For a luma value for a pixel, the respective gain value is typically the gain value determined for that pixel. For a chrominance value (having a lower resolution than the pixel resolution), the respective gain may be a gain determined for the position of the chrominance value by the first or second spatial downscaler.

It was an important insight of the inventor to have the upscaling the chrominance coefficients be coordinated to be the same as the upscaling used in the video encoder which encoded the high dynamic range images as a set of encoded low dynamic range images. This regards a particular issue which for the first time occurring in such dynamic range conversion technologies.

It may be advantageous to have a video decoder in which the first and second spatial upscaler (501, 502) are programmable to apply at least two different upscaling algorithms, and arranged to receive the upscaling algorithm to be used (INTSTR1) for decoding the presently input set of encoded low dynamic range images (Im_COD). There may be several reasons to have different upscaling (and downscaling) algorithms, e.g. depending on whether for whatever reason one has decided to have the subsampled chrominance values co-sited with the high resolution luma samples, or at new places intermediate, where no lumas exist, etc., and which sub-sampling was used in the vertical respectively horizontal direction, which may all be different etc. Usually this should be the same for each video, but it may change e.g. when a television switches to another channel. It is then advantageous that the particular upscaling algorithm (and preferably also the used downscaling algorithm for the gain values in case that is not fixed) can be forced into exactly the same one used at the encoder, because as said that is needed for accurate dynamic range conversion. The encoder need not actually communicate the algorithm as code, but typically it will in a rescaling strategy type indicator INTSTR1 indicate which type of interpolation is used, e.g. the intermediate missing values of the chrominances are copied from their neighbor, or equated as a weighed combination from their neighbours, etc., and then INTSTR1=2 being communicated as metadata, e.g. a SEI message, could e.g. universally be interpreted by all decoders as weighing the immediate left and right Cr respectively Cb values with a weight of ½ each. In principle the two upscaling or downscaling algorithms could be different for the two chrominances, but typically both chrominance components are defined similarly, i.e. their upscaling respectively downscaling algorithms will be the same, and only one INTSTR1 may be needed. In the simpler cases the downscaling may simply be a dropping in case of co-sited chrominance coefficients co-sited with luma samples, i.e. in case both a luma and two chrominances are present at a pixel location, all three of them get multiplied by the same gain value, but in case only a luma is available, this luma is multiplied by the gain value applicable and calculated for that position, but no chrominance values are multiplied as they don't exist there. But in general, there may be interpolation strategies incorporated in the downscaling algorithms for the gain factors, so there can also be embodiments where the gain value for the luma is actually somewhat different from the one for the chrominances, although typically both chrominances will have the same gain value. One could also incorporate saturation adjustment strategies in that part of the processing circuit, but we will consider that outside what is needed for elucidating our basic new concepts.

It may be further advantageous if the video decoder (220) comprises a color converter (512) arranged to convert the output set of high dynamic range images (Im_RHDR) from a Y'CbCr representation defined with an inverse gamma of 0.5 (or 1/(2.4)) into a high dynamic range RGB color representation. E.g., it may be advantageous to drive a connected display already with the correctly optimally graded high dynamic range RGB color components. This display may accept pixel colors which are defined in e.g. HDR10, or any HDR-OETF-based e.g. 10 or 12 bit representation of the additive primary RGB color channels needed for establishing the local color contributions as they can be realized e.g. with LCD valves, or OLED sub-pixels, etc. This does not intend to limit that both any intermediate apparatus in which the video decoder may reside, and/or the connected display may do all kinds of further color conversions, color optimizations etc., and in some embodiments the decoder may reside e.g. directly in a television or mobile device, without the need of an intermediate apparatus like a settopbox, blu-ray player, computer, professional cinema HDR video receiver for supplying a HDR cinema projector, image pre-analysis system in a video surveillance system, video telecommunication or telepresence system, medical system with HDR output, etc.

As an example the video decoder (220) may output as final output red, green and blue color components (R", G", B") of the high dynamic range image represented with RGB pixel colors which are defined with an opto-electrical transfer function (OETF) as defined in SMPTE 2084.

Advantageously one has a method of video decoding arranged to decode and output a set of temporally successive high dynamic range images (Im_RHDR) from coded input images which are a set of encoded low dynamic range images (Im_COD) which are in a format wherein pixel colors are represented by luma values (Y'4L) and chrominance values (C'b0L, C'r0L), the chrominance values (C'b0L, C'r0L) being sub-sampled spatially compared to the luma values (Y'4L), the method comprising:
  decoding the encoded low dynamic range images into uncoded low dynamic range images (Im_RLDR);
  upscaling the chrominance values of the low dynamic range images (Im_RLDR) to a resolution of the luma values;
  converting for each pixel of the low dynamic range images (Im_RLDR), the luma value and chrominance values into a non-linear R'G'B' representation (R'4, G'4, B'4) comprising three non-linear R'G'B' color values;
  calculating, for each pixel, a maximum (m) of the three non-linear R'G'B' color values;
  receiving a luminance mapping function (TM) which defines a relationship between luminances or lumas of one of the low dynamic range input images (Im_RLDR) being processed to luminances respectively lumas of the corresponding high dynamic range output image (Im_RHDR) to be obtained, and, for each pixel, applying the luminance mapping function to the maximum (m), yielding an output maximum (m*);
  calculating, for each pixel, a gain value (g) by dividing the output maximum (m*) by the maximum (m);
  spatially downscaling the gain values to a resolution of the chrominance coefficients values of the low dynamic range images; and
  multiplying, for each pixel, the luma value and the chrominance values (C'b0L, C'r0L) of the uncoded low dynamic range input image (Im_RLDR) being processed with the determined respective gain value (g), the respective gain values for the chrominance values being downscaled gain value. Advantageously one has a method of video decoding as claimed in claim 5, in which the upscaling is programmable and can apply at least two different upscaling algorithms, and applies a received upscaling algorithm to be used (INTSTR1) for decoding the presently input set of encoded low dynamic range images (Im_COD).

At the video creation side one has a video encoder (221) arranged to encode a set of temporally successive high dynamic range images (MAST_HDR) into encoded images which are a set of encoded low dynamic range images (Im_COD) which are in a format wherein pixel colors are represented by luma values (Y'4L) and chrominance values (C'b0L, C'r0L), the chrominance values (C'b0L, C'r0L) being sub-sampled spatially compared to the luma values (Y'4L), the video encoder comprising:
  a spatial downscaler (405) arranged to sub-sample chrominance values (C'b4, C'b4) of one of the high dynamic range images (MAST_HDR) into sub-sampled chrominance values (C'b0, C'r0) of the pixel colors of the one of the high dynamic range images (MAST_HDR);
  a first and second spatial upscaler (406, 407) arranged to upscale the sub-sampled chrominance values (C'b0, C'r0) to a resolution of the luma values (Y'4) of the one of the high dynamic range images (MAST_HDR);
  a color convertor (408) arranged to, for each pixel of the one of the high dynamic range images (MAST_HDR), convert the luma values and the upscaled chrominance values of pixel colors of the one of the high dynamic range images (MAST_HDR) into a non-linear R'G'B' representation (R'4, G'4, B'4) comprising three non-linear R'G'B' color values;
  a maximum calculation unit (409) arranged to, for each pixel, output a maximum (m) of the three non-linear R'G'B' color values;
  a luminance mapping unit (410) arranged to receive a luminance mapping function (TM) which defines a relationship between luminances or lumas of a corresponding one of the low dynamic range input images (Im_LDR) to be encoded as an encoded low dynamic range image (Im_COD) and the luminances respectively lumas of the high dynamic range output image (MAST_HDR) being encoded, and arranged to, for each pixel, apply the luminance mapping function to the maximum (m), yielding an output maximum (m*);
  a gain factor calculator (411) arranged to, for each pixel, obtain a gain value (g) by dividing the output maximum (m*) by the maximum (m);
  a first and second spatial downscaler (412, 413) arranged to spatially downscale the calculated gain values to a resolution of the sub-sampled chrominance values (C'b0, C'r0) of the pixel colors of the one of the high dynamic range images (MAST_HDR); and
  multipliers (414, 415, 416) arranged to, for each pixel, multiply the luma values and sub-sampled chrominance values (C'b0, C'r0) with the determined respective gain value (g), the respective gain values for the sub-sampled chrominance values being downscaled gain values.

The high dynamic range images may be in a format wherein pixel colors are represented by luma values and chrominance values. A pixel color may specifically be represented by one luma value and two chrominance values, i.e. the pixel colors may be represented by one luma channel and two chrominance channels. The resolution of the luma values and the chrominance values (before sub-sampling) for the high dynamic range images is typically the same as the pixel resolution of the high dynamic range images. The resolution of the chrominance values of the high dynamic range images following sub-sampling/downscaling is lower than the pixel resolution of the high dynamic range images, and thus typically lower than the pixel resolution of the high dynamic range images. A sub-sampled chrominance value may typically be common for a plurality of luma values/pixels of the low dynamic range images.

A maximum m, output maximum m*, and gain value may be determined for each pixel of the high dynamic range images, and each pixel of the high dynamic range images may be multiplied by the corresponding gain value (it will be appreciated that for sub-sampled chrominance values being common for a plurality of pixels, only one multiplication may be performed, i.e. a single common multiplication may implement the multiplication of chrominance values and the gain values for a plurality of pixels). The respective gain value for a given luma or chrominance value may be a gain value determined for the position of the value from the values determined by the gain factor calculator. For a luma value for a pixel, the respective gain value is typically the gain value determined for that pixel. For a chrominance value (having a lower resolution than the pixel resolution), the respective gain may be a gain determined for the position of the chrominance value by the first or second spatial downscaler.

It may be advantageous to have a video encoder wherein the first and second spatial upscaler are determined to apply a fixed upscaling algorithm which is pre-agreed to be used by all decoders to be supplied with the set of encoded low dynamic range images.

Advantageously, the first and second spatial upscaler (406, 407) are determined to apply a fixed upscaling algorithm which is pre-agreed to be used by all decoders to be supplied with the set of encoded low dynamic range images (Im_COD).

Advantageously one has a method of video encoding arranged to encode a set of temporally successive high dynamic range images (MAST_HDR) into encoded images which are a set of encoded low dynamic range images (Im_COD) which are in a format wherein pixel colors are represented by luma values (Y'4L) and chrominance values (C'b0L, C'r0L), the chrominance values being sub-sampled spatially compared to luma values (Y'4L), the method comprising:

spatially sub-sampling chrominance values (C'b4, C'b4) of one of the high dynamic range images (MAST_HDR) being encoded into sub-sampled chrominance values (C'b0, C'r0) of the pixel colors of the one of the high dynamic range images (MAST_HDR);

upscaling the sub-sampled chrominance values (C'b0, C'r0) to a resolution of the luma values (Y'4) of the one of the high dynamic range images (MAST_HDR);

converting, for each pixel of the one of the high dynamic range images (MAST_HDR), the luma values and the upscaled chrominance values of pixel colors of the one of the high dynamic range images (MAST_HDR) into a non-linear R'G'B' representation (R'4, G'4, B'4) comprising three non-linear R'G'B' color values;

calculating, for each pixel, a maximum (m) of the three non-linear R'G'B' color values;

receiving a luminance mapping function (TM) which defines a relationship between luminances or lumas of the corresponding one of the low dynamic range input images (Im_LDR) to be encoded as an encoded low dynamic range image (Im_COD) and the luminances respectively lumas of the high dynamic range output image (MAST_HDR) being encoded, and, for each pixel, applying the luminance mapping function to the maximum (m), yielding an output maximum (m*);

calculating, for each pixel, a gain value (g) by dividing the output maximum (m*) by the maximum (m);

spatially downscaling the calculated gain values to a resolution of the sub-sampled chrominance values (C'b0, C'r0) of the pixel colors of the one of the high dynamic range images (MAST_HDR); and multiplying the luma values and sub-sampled chrominance values (C'b0, C'r0) with the determined respective gain value (g), the respective gain values for the chrominance values being downscaled gain values.

The present new technical ideas may be embodied in various forms, such as connected systems, partial services on remote locations which may be communicated over generic or dedicated networks, a computer program product comprising code which when run on a processor enables the processor to perform all methods steps of one of the above method claims, any video signal codification comprising the codification INTSTR1 uniquely specifying the upscaling algorithm which must be used at both the encoder and decoder, and if applicable a codification INTSTR1* equating the downscaling algorithm for the gain values, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings:

FIG. 6 schematically shows two possible algorithms for upsampling sub-sampled chromaticities to the resolution of the lumas.

DETAILED DESCRIPTION OF THE EMBODIMENTS

Figure 1:
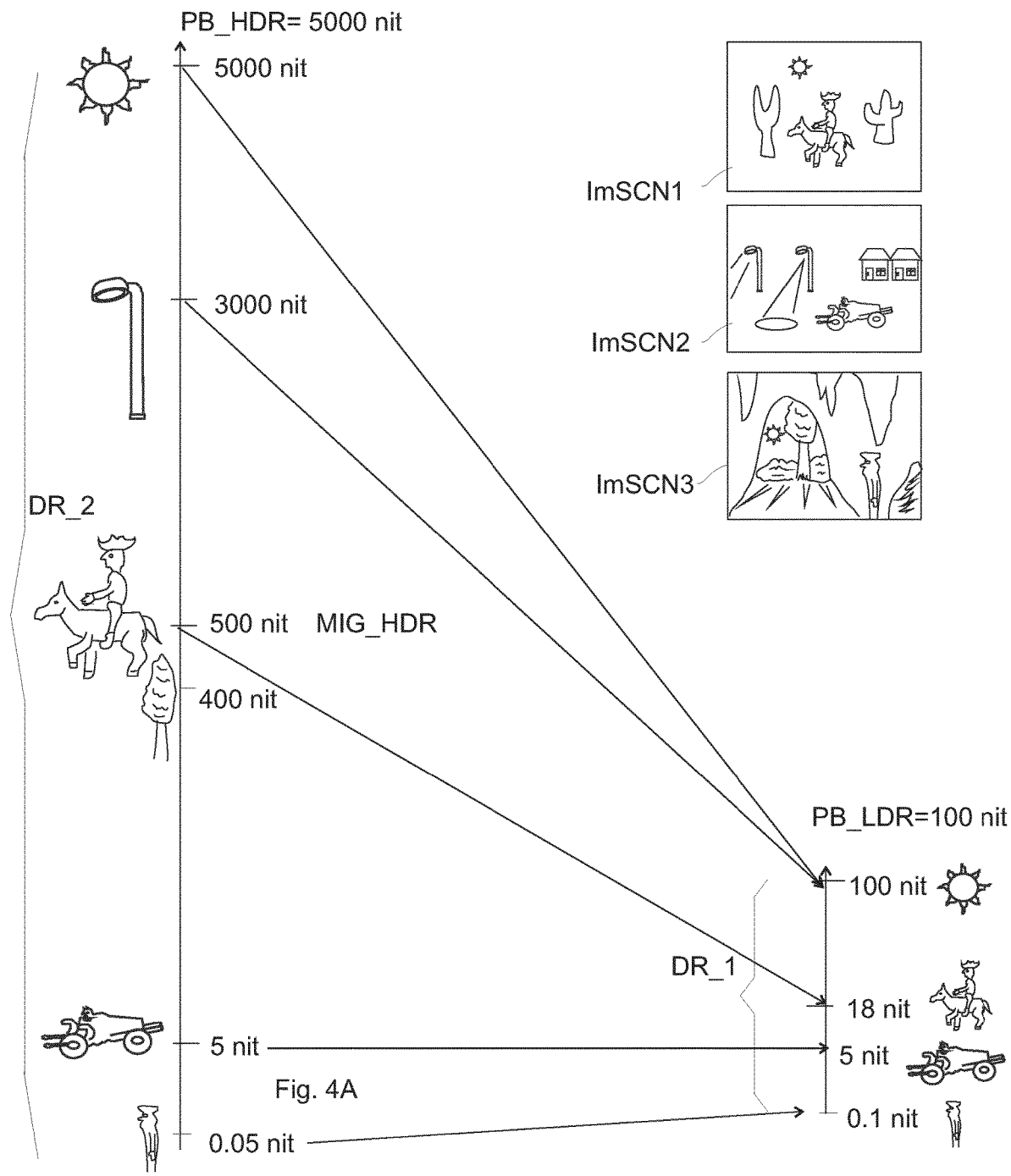
FIG. 1 schematically illustrates a number of typical color transformations which occur when one optimally maps a high dynamic range image to a corresponding optimally color graded similarly looking (as similar as desired and feasible given the differences in the first and second dynamic ranges DR_1 resp. DR_2), which in case of reversibility would also correspond to a mapping of an LDR image of the HDR scene, to a HDR image of that scene.
Figure 2:
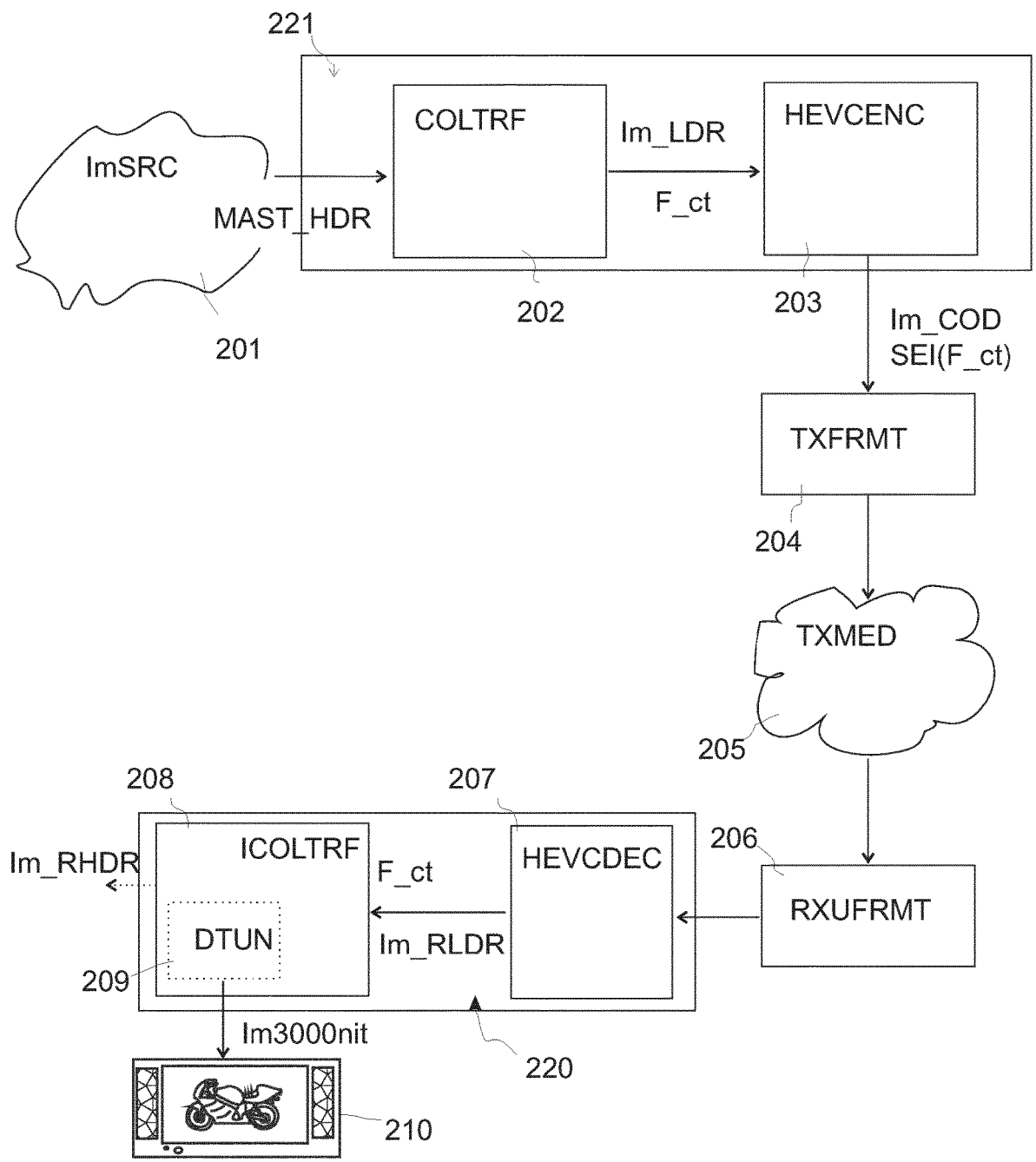
FIG. 2 schematically illustrates a technology to encode high dynamic range images, i.e. images capable of having luminances of at least 400 nit typically or more, which applicant recently developed, which actually communicates the HDR image(s) as an LDR image plus metadata encoding color transformation functions comprising at least an appropriate determined luminance transformation for the pixel colors, to be used by the decoder to convert the received LDR image(s) into HDR images(s) which are a faithful reconstruction of the original master HDR image(s) created at the image creation side.
Figure 3:
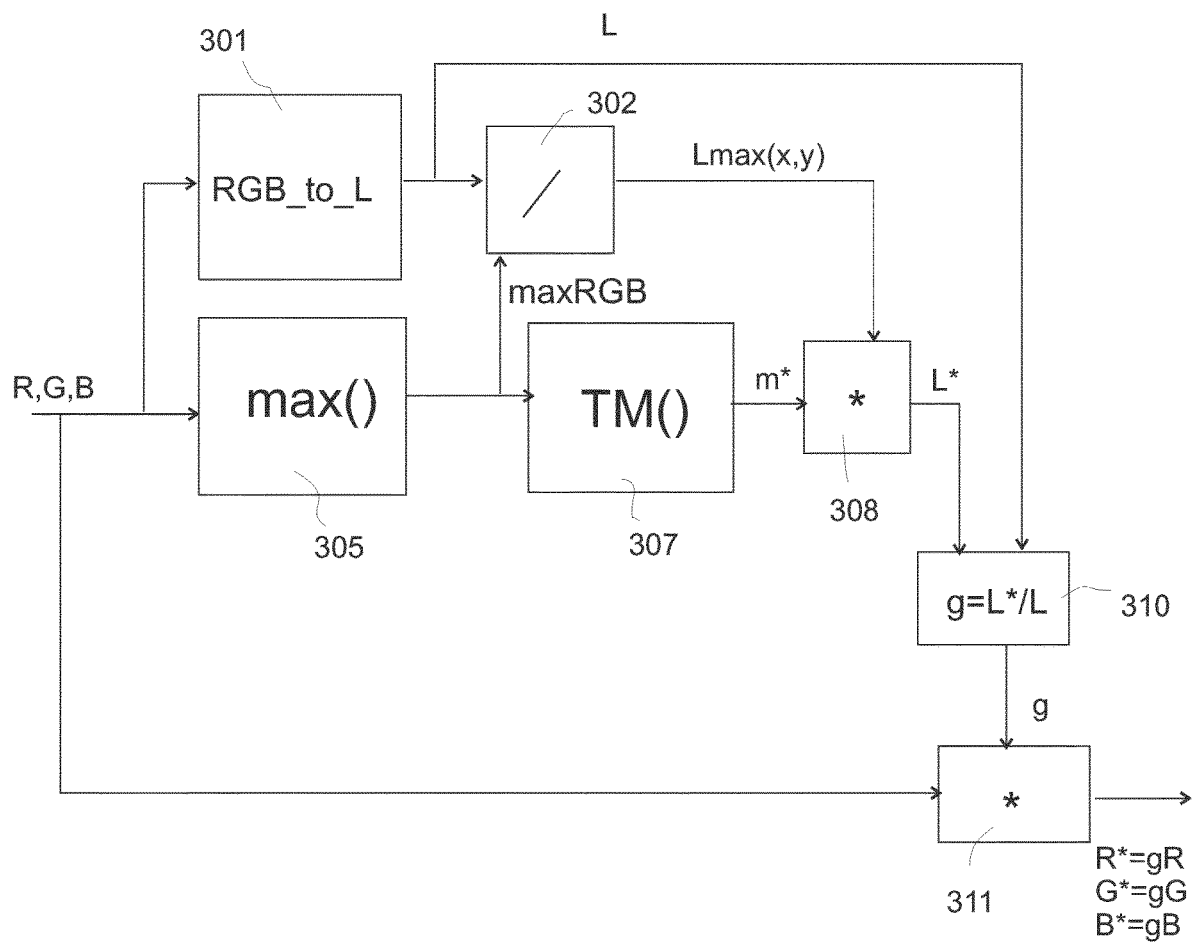
FIG. 3 schematically illustrates a first version technology of applicant which can be used to enable a within-gamut color (i.e. chromaticity)-preserving luminance transformation for changing the brightnesses of image objects or pixels for making them more conforming to what is needed in an image of a dynamic range which is different and specifically larger than the dynamic range of the input image, which works well for particular types of situations.
Figure 4:
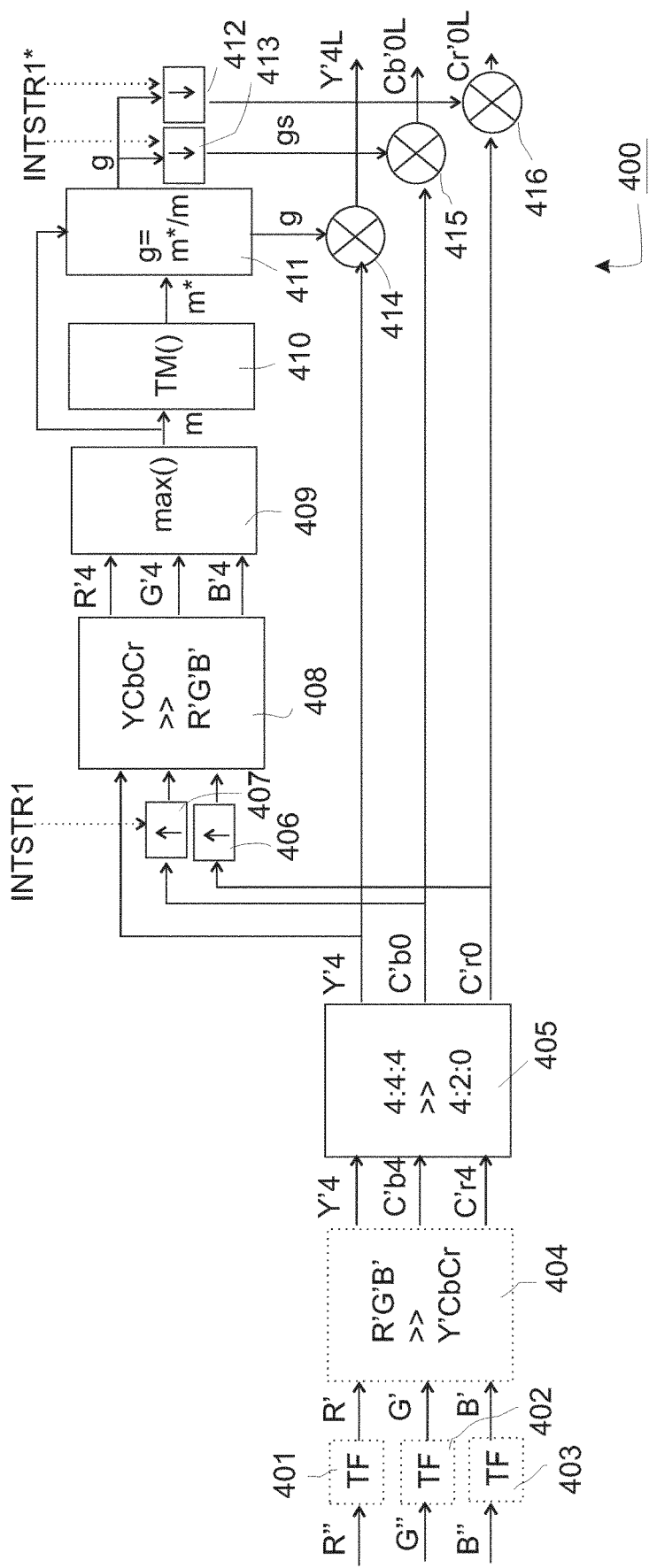
FIG. 4 schematically shows the newly invented colorimetric core part (400) for calculating the dynamic range transform of a video decoder.

FIG. 4 shows a typical exemplary embodiment of how to build the new encoder. It is assumed that the master HDR image is defined in an R"G"B" color representation according to a SMPTE ST2084 OETF. Three color component transformation units (401, 402, 403) apply the function which redefines those values in a square root (in this elucidation, or alternatively e.g. defined by a 1/(2.4) power) OETF representation (i.e. one can interpret this as first transforming the R"G"B" values into linear color components RGB, and then in square root versions R'G'B', but this can be done by applying one function). The color transformer 404 transforms this in a Y'CbCr format. This is what HEVC encoder expect typically, but the reader should understand that this still is a strange image, as it is an HDR image forced in an LDR color representation framework, but that doesn't matter since the rest of the color processing unit will handle that appropriately. Then this Y'CbCr representation of the pixel colors is in spatial subscaler 405 subsampled to e.g. 4:2:0, i.e. dropping 75% of the chrominance values, yielding the sub-sampled image representation of the HDR master image: Y'4, C'b0, C'r0.

Thus, the pixel colors are following the spatial subscaler 405 represented in a non-linear format comprising one luma value and typically two spatially subsampled chrominance values.

Then in the dynamic range transformation path in which suitable gains for achieving the desired transformation is determined, this signal needs to be upsampled again, to get the right resolution for the dynamic range transform (remember that the lumas are on the original, full resolution). It is important however that this is done in a consistent manner, and exactly the same manner as the decoder will apply it. Whatever the "real" values of the high resolution Y'CbCr values are is then not so much important, as it is important that the encoder and decoder do the same dynamic range transformation, so that at any decoder/receiver side it is fully reversible (at least up to some errors like banding from word length, and DCT errors and the like). This allows the original master HDR image to be be reconstructed with high accuracy, yet, whilst having all the benefits of this HDR encoding technology, such as inter alia, a good LDR image quality (in particular with no color desaturation as would occur with typical non-chromaticity preserving dynamic range changing color processing), staying within the achievable color gamut, which would again avoid color errors due to clipping, etc.

Indeed, a particular advantage of the described approach is that it allows the processing (upscaling) to be performed in both the encoder and the decoder based on the same values (assuming ideal coding/decoding). Thus, the degradation associated with downsampling in the encoder and upsampling in the encoder can be avoided and the exact same processing can be implemented in both units.

The correctly, coordinatedly upsampled YCbCr colors are then converted into non-linear R'G'B' colors by color converter 408. Thus, the YCbCr representation is converted into an RGB format which is non-linear.

Subsequently, a maximum calculation unit determines the largest/maximal one of those three color components as maximum m, of the original or input colors.

Separately, one has determined a luminance mapping or transformation function TM( ), which is a good or reasonable manner to transform the object or pixel luminances of the HDR image representing the scene into the LDR image luminances. I.e. this is typically a function which defines for each possible input luminance [0.0, 1.0] an output luminance. There might also be local luminance transformations involved, i.e. giving the same luminance e.g. 0.45 in an upper region being the sky a different output luminance then the one it would have if that 0.45 luminance occurred for a pixel in the lower, ground part of the image, but for this elucidation we will assume global luminance mappings solely. There may in the color conversions of the dynamic range transformation also be comprised in the total set of functions (F_ct) also for various reasons one or more chromatic color transformation such as a saturation change (e.g., one of the images may be in a different color space, such as the HDR image in Rec. 2020 and the LDR image in Rec. 709 RGB primaries, or one may additionally boost the saturations of colors which need to become dark in the LDR image compared to in the HDR image, to increase their vividness), but for simplicity of elucidation of the present new concept we will assume that the color transformation F_ct consists solely of a single luminance transformation function. Where this function may actually be defined in the luma domain similarly, we will without loss of generality assume that it is a function which specifies how each HDR relative luminance (i.e. in [0.0, 1.0]) should map to its corresponding relative LDR luminance, and to avoid further complications we assume float numbers, since the amount of bits for each representation can also be determined at a later stage, e.g. when formatting the Y'4L, Cb'0L, and Cr'0L for entering the HEVC encoder. E.g., in case a human color grader is involved, he may specify the desired shape of the luminance transformation function TM( ) by using color grading software, and this may e.g. be a three-part-curve which reserves some sub-range for the bright, middle and dark colors in the HDR image, which sub-ranges are then implicitly defined in the shape of the curve, or, he may further fine-tune that shape in a small sub-region of the input luminances where more or vice versa less contrast is required, etc. If the encoder is connected to a direct video supply, e.g. in a real-life broadcast, a good luminance mapping may have been established previously in a coarse manner, which is sufficiently good for the entire program, e.g. even when the camera moves between brighter and darker parts of the scene, or turns towards a brighter sub-area etc. This simple function may also have been (partly) determined by a human, or even automatically, e.g. based on the statistics of the luminances in a number of captured typical images, etc. The details of how the luminance transformation function TM( ) has been established is not important for the elucidation of this invention or some of its embodiments, as it suffices there is one.

This luminance transformation function TM( ) (between the domains [0.0, 1.0] and [0.0, 1.0]) is now by a luminance mapping unit 401 applied to the maximum m, which by definition also falls within [0.0, 1.0], yielding a corresponding output maximum color component, the output maximum m*.

This information conveys that a pixel color has e.g. been brightened relatively, but now in a maximum color component representation. The required gain value for ultimately doing the color transformation, i.e. on all three color components, as a single multiplication, is calculated as g=m*/m and this is determined in gain factor calculator 411.

A second problem is that these gain values are now again not at the resolution (and potentially even the spatial location) in which they are needed for multiplying the Y'4, C'b0 and C'r0 color components as they come in, i.e. some more or less difficult downscaling has to happen, but again in a manner which is consistent in both the encoder and decoder, otherwise there may still be conversion errors, leading to incorrect HDR pixel color artefacts (of course if only a single method for this downscaling is used, encoder and decoder will by definition be consistent as to this aspect, so in some embodiments no synchronizing information INTSTR1* as to the used downscaling algorithm needs to be communicated to any receiver, but in any case one should always safeguard that all to be serviced decoders are consistent with the particular used encoder, which generated the HDR video to be decoded).

Therefore, downscalers 412 and 413 process the determined gain values to perform the appropriate downscaling of the gain values. Specifically, the gain values may be determined as a 2-dimensional set of calculated gain values at the resolution of the luma values, and this may be downscaled by the downscalers 412 and 413 to the resolution of the chrominance values. Thus, effectively, a full resolution "gain image" can be downscaled to the resolution of the chrominance values (a downscaling by a factor of four in the specific example).

The resulting gains may be applied to multipliers 414, 415, 415 which multiply the luma and downsampled chrominance values from the spatial subscaler 405. Thus, appropriate gain values are determined for the respective multipliers 414, 415, and 416, which multiply the color components as they come in, ultimately realizing the required dynamic range transformation to the LDR image.

The resulting LDR image may then be encoded with potentially some legacy DCT-based video compression strategy, in an image representation which is already in a suitable format (i.e. YCbCr, and with sub-sampled chrominance components). This yields Y'4L, Cb'0L, and C'r0L, the luma, and blue respectively red chrominance, of what is now a real LDR image (in fact a legacy SDR image; defined in a Rec. 709 OETF-based format, or the good approximation thereof being a square-root-non-linear RGB-based format), but an LDR image which corresponds to the HDR image, in that it is not only a directly viewable LDR image (i.e. giving a good visual quality of the present HDR scene when seen on a 100 nit SDR TV, e.g. in a horror movie with the dark parts not being too dark, which would not happen if one shows a HDR image on a SDR display, because all action in the dark would then map to near-indiscriminable black). But also, which LDR image (Im_RLDR decompressed at any receiving side) can be color transformed with the co-received metadata (SEI(F_ct)) containing the needed color transformation functions (at least the one luminance transformation function) into the close high quality reconstruction HDR image Im_RHDR of the original created HDR image MAST_HDR.

Two examples of possible upscaling algorithms are shown in FIG. 6. The circles give pixel positions (in the highest resolution format, which we will call 4:4:4) where two chrominance values exist in addition to of course a luma value (i.e. whether in the decoder or the encoder preparing the dynamic range transform), i.e. at some pixel places there will not be chrominances available, but only lumas (the squares). FIG. 6A elucidates an algorithm in which the required chrominances for pixel positions in which they are not available are determined by copying the values from an adjacent neighbor, which neighbor is indicated with the arrows. FIG. 6B gives an alternative algorithm, in which missing values are determined as averages of neighbouring values, e.g. Cb(0,1)=0.5Cb(0,0)+0.5Cb(0,2), etc., wherein the (0,0) etc. are the pixel position coordinates (x,y) of some position in the image.

Figure 5:
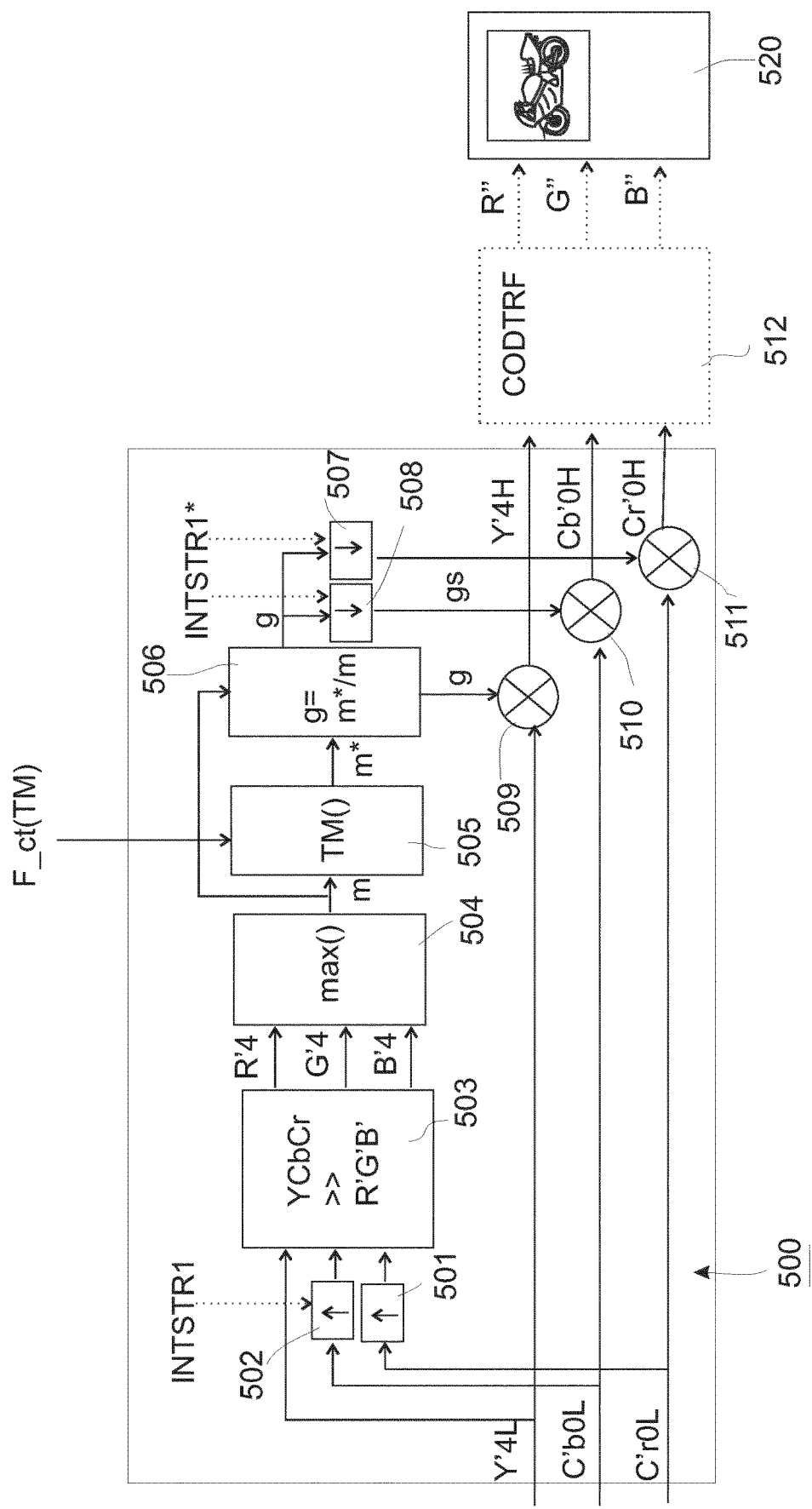
FIG. 5 schematically shows the newly invented colorimetric core part (500) for calculating the dynamic range transform to the low dynamic range image corresponding to the master HDR image of a encoder, which is suitable to operate with installed legacy video compression technologies like HEVC, and the further video communication technologies based thereupon, or future similar video compression technologies.

FIG. 5 shows the corresponding color transformation part for establishing the luminance dynamic range transformation in a decoder (the luminance dynamic range transformation now being from the received low dynamic range image, Im_COD decompressed into Im_RLDR, to the high dynamic range image as it is needed, e.g. the 5000 nit master original, or a 3000 nit equivalent automatic re-grading thereof in case a 3000 nit display is connected, which can also be realized by using the information in the grading functions encoding how different dynamic range images should ideally look).

Specifically, the generated SDR signal from the circuit of FIG. 4 may be encoded in e.g. an HEVC encoder and transmitted to a receiver/decoder. This may comprise an HEVC decoder which delivering pixels with pixel colors represented by luma values and spatially sub-sampled chrominance values, and specifically it provides Y'4L, C'b0L, C'r0L (LDR or in fact SDR) color values/components. The chrominance values are spatially upscaled by upscalers 501 and 502, which as said employ exactly the same algorithm as the encoder has used for establishing the dynamic range downgrading.

In case there is not a single algorithm possibility in some technology deployment (e.g. conversely some decoders for proprietary internet-based systems may be suitable only for one fixed encoder-embodiment having one fixed upscaling algorithm only), the upscalers may be programmed (e.g. under control of some CPU unit) to employ that algorithm which corresponds to the received INTSTR1 algorithm type indication for this video (e.g. type #3 being algorithm nr. 3; or the skilled person understands how one could communicate this in various manners). In other words, the exact upscaling algorithm employed by the upscalers 501 and 502 may be determined from data received with the images such that it can be made identical to the upscaling algorithm used in the encoder.

The upscaled full resolution YCbCr colors are then as they come in pixel per pixel converted to non-linear R'G'B' colors by color converter 503, and then the maximum m is calculated by maximum calculation unit 505. Then the luminance mapping/function TM( ) is applied to the maximum by luminance mapping unit 505. As the skilled reader will understand, this is of course the inverse function, or the inverse set of functions of the encoder's downgrading to SDR, and if the function is embodied in a LUT, then swapping of the axes is sufficient. The gain calculation unit 506 determines the appropriate gain value corresponding to this input color, in particular its luminance, given this luminance transformation strategy as defined by the luminance mapping TM. These gain values are correctly downsampled as needed, by downsamplers 507 and 508, in some embodiments programmed to different algorithms depending on the received indication INTSTR1* of which algorithm should be used. Then multipliers 509, 510, and 511 calculate the final color transformation with the appropriate gain values (g for the lumas and gs for the chrominances, although in some embodiments these will have the same value), which effectively determines the HDR pixel colors for the received LDR image, being the inverse of the downgrading at the encoding side.

Thus, the approach of the decoder may correspond closely to the approach of the encoder but with the luminance transformation TM( ) being different, and in many cases with these being the inverse of each other.

Finally, whereas typically the HDR pixel colors may in this embodiment by calculated in a YCbCr color representation, there may again be any color transformer 512 for color conversion to any particular needed color representation, e.g. for communicating the image to any connected display 520, e.g. over a HDMI connection, etc. As said above, the color transformations F_ct, and in particular the luminance transformation TM come in some manner from the content creation side, e.g. a CPU may read them from metadata associated with the encoded LDR images, e.g. co-stored on an optical disk or other memory, co-communicated over a network, etc.

The described systems may specifically provide an approach for effectively generating and communicating signals that may effectively represent both HDR and SDR images. The approach may include a color preserving approach to adapting between HDR and SDR signals. Further, the dynamic range transformations may be applied directly to pixel colors based on a non-linear representation including a luma value and (at least) two spatially sub-sampled chrominance values. Thus, in contrast to e.g. approaches of WO2014056679, the current approach does not rely on a representation of images by pixel colors being linear RGB values at full resolution.

The approach may allow a better quality and/or more efficient processing. For example, MPEG encoders typically operate on non-linear color-subsampled signals, such as e.g. Y'C'bC'r 4:2:0. Conventionally, this requires conversion from this format to full resolution linear RGB values. However, such a conversion is complex and has a high computational burden. It also tends to be suboptimal and introduce image quality degradations. For example, the sub-sampling of the chrominance components can result in the generated RGB values at the decoder side being different from those that were used at the encoder side, especially near edges in the video signal (where also the MPEG encoder tends to make somewhat larger compression errors, hence amplifying the difference). This difference can lead to visible differences (artefacts) in the reconstructed HDR signal.

However, in the current approach, such conversions can be avoided in the signal path and the dynamic range adaptation can be applied directly to the luma/chrominance values, and specifically directly to a Y'C'bC'r 4:2:0. Further, the conversion applied in the gain determining path can be based on the same values that are present in the encoder and can use the exact same algorithms as used in the decoder. Thus, improved quality can be achieved.

In practice it has been found that the chrominance sub-sampling commonly applied as pre-processing step to MPEG or JPEG compression can cause a mismatch between encoder- and decoder side processing, and that this mismatch can lead to visible artefacts in the reconstructed HDR video signal. Such issues can be avoided or mitigated in the described system wherein the the HDR to SDR conversion and the color representation conversion are integrated into the same function. This integration may also make it easier to standardize the SDR to HDR conversion that takes place at the decoder side (by making the conversion part of the decoding specification).

The approach is based on the insight that some of the specific functions that are conventionally applied in the linear RGB domain can be ported to a non-linear sub-sampled luma/chrominance domain by integrating functions and changing the order in which various functions are performed. It also reflects the insight that the dynamic range conversion can in this way be applied on the sub-sampled chrominance signals, and that doing so can remove/reduce the mismatch between the encoder and decoder sides (since the same sub-sampled chrominance data is available at both the encoder and decoder side (ignoring differences, i.e. compression errors, caused by the MPEG compression itself)).

Thus, traditionally, the encoder approach would require an HDR signal to be in a linear full resolution RGB format with the HDR to SDR conversion first being applied to this. This would generate an RGB SDR signal which would then be converted to an YCbCr SDR signal (with chrominance downscaling). Thus, HDR to SDR conversion is performed in the RGB domain and with full resolution and this is followed by a separate operation in which the resulting RGB SDR signal is converted into an YCbCr SDR signal for encoding.

Similarly, the complementary operation would traditionally be performed in the decoder. Indeed, the received decoded image will be a chrominance downsampled YCbCr SDR image that is first converted to a full scale RGB SDR signal followed by a subsequent and independent SDR to HDR conversion. Thus, similarly in the decoder, the received chrominance downsampled YCbCr SDR signal is first converted to a full scale RGB SDR signal. Only then is the SDR to HDR conversion performed, and thus the dynamic range conversion is entirely performed in the full resolution RGB domain.

The current approach is fundamentally different. Indeed, in the current approach the SDR/HDR conversions are performed in the non-linear downscaled luma chrominance domain and not in the full scale and linear RGB domain. Indeed, gain values are determined and then applied directly to the luma/chrominance values.

For example, in FIG. 5, the received YCbCr values are directly fed to the multipliers 509, 510, 511 where they are multiplied by gain values to produce a dynamic range adjusted YCbCr output image. Further, upscaling and conversion to an RGB format is in this approach performed as part of the SDR to HDR conversion but with this being performed only in the gain determination path and with no such functions being performed anywhere in the signal path to generate the HDR image (but of course the YCbCr to RGB is in the example subsequently performed in the HDR domain by block 512).

Thus, in the current exemplary approach, the processes of color representation conversion, resolution change, and dynamic range conversion are closely integrated in a single process rather than being separate and independent sequential processes. Further, the dynamic range conversion is performed in the luma and chrominance domain rather than in an RGB domain. Further, the dynamic range conversion is performed in the downscaled domain, and indeed is typically performed at different resolutions for the luma values and the chrominance values.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A video decoder arranged to decode and output a set of high dynamic range images from coded input images which are a set of encoded low dynamic range images which are in a format wherein pixel colors are represented by luma values and chrominance values, the chrominance values being sub-sampled spatially compared to the luma values, the video decoder comprising:
    a video decoder arranged to decode the set of encoded low dynamic range images into uncoded low dynamic range images;
    a first and second spatial upscaler arranged to upscale chrominance values of the set of low dynamic range images to a resolution of the luma values;
    a color convertor arranged to, for each pixel of the set of low dynamic range images, convert the luma value and chrominance values into a non-linear R'G'B' representation comprising three non-linear R'G'B' color values;
    a maximum calculation unit arranged to output, for each pixel, a RGB maximum, wherein the RGB maximum is the maximum of the three non-linear R'G'B' color values;
    a luminance mapping unit arranged to receive a luminance mapping function which defines a relationship between luminances or lumas of one of the set of low dynamic range input images being processed to luminances respectively lumas of the corresponding one of the set of high dynamic range images to be obtained, and arranged to, for each pixel, apply the luminance mapping function to the RGB maximum, yielding an output maximum;
    a gain factor calculator arranged to, for each pixel obtain a gain value by dividing the output maximum by the RGB maximum;
    a first and second spatial downscaler arranged to spatially downscale the gain values to a resolution of the chrominance values of the set of low dynamic range images; and
    multipliers arranged to, for each pixel, multiply the luma value and chrominance values of one of the set of low dynamic range input image being processed with the determined respective gain value, the respective gain values for the chrominance values being downscaled gain values,
    wherein the first and second spatial upscaler are coordinated to be the same as those used in the video encoder which encoded the set of high dynamic range images as the set of encoded low dynamic range images.

2. A video decoder as claimed in claim 1, in which the first and second spatial upscaler are programmable to apply at least two different upscaling algorithms, and arranged to receive the upscaling algorithm to be used for decoding the set of encoded low dynamic range images.

3. A video decoder as claimed in claim 1, comprising a color converter arranged to convert the output set of high dynamic range images from a Y'CbCr representation defined with an inverse gamma of 0.5 into a high dynamic range RGB color representation.

4. A video decoder as claimed in claim 3, in which red, green and blue color components of the high dynamic range RGB color representation are defined with an opto-electrical transfer function as defined in SMPTE ST2084.

5. A method of video decoding arranged to decode and output a set of high dynamic range images from coded input images which are a set of encoded low dynamic range images which are in a format wherein pixel colors are represented by luma values and chrominance values, the chrominance values being sub-sampled spatially compared to the luma values, the method comprising:
    decoding the set of low dynamic range images into uncoded low dynamic range images;
    upscaling the chrominance values of the set of low dynamic range images to a resolution of the luma values;
    converting for each pixel of the set of low dynamic range images, the luma value and chrominance values into a non-linear R'G'B' representation comprising three non-linear R'G'B' color values;
    calculating, for each pixel, a RGB maximum, wherein the RGB maximum is the maximum of the three non-linear R'G'B' color values;
    receiving a luminance mapping function which defines a relationship between luminances or lumas of one of the set of low dynamic range input images being processed to luminances respectively lumas of the corresponding one of the set of high dynamic range images to be obtained, and, for each pixel, applying the luminance mapping function to the RGB maximum, yielding an output maximum;

calculating, for each pixel, a gain value by dividing the output maximum by the RGB maximum;

spatially downscaling the gain values to a resolution of the chrominance coefficients values of the set of low dynamic range images; and multiplying, for each pixel, the luma value and the chrominance values of the uncoded low dynamic range input image being processed with the determined respective gain value, the respective gain values for the chrominance values being downscaled gain value; wherein the upscaling of the chrominance coefficients is coordinated to be the same as the upscaling used in the video encoder which encoded the set of high dynamic range images as a set of encoded low dynamic range images.

6. A method of video decoding as claimed in claim 5, in which the upscaling is programmable and can apply at least two different upscaling algorithms, and applies a received upscaling algorithm to be used for decoding the presently input set of encoded low dynamic range images.

7. A video encoder arranged to encode a set of high dynamic range images into encoded images which are a set of low dynamic range images which are in a format wherein pixel colors are represented by luma values and chrominance values, the chrominance values being sub-sampled spatially compared to the luma values, the video encoder comprising:

a spatial downscaler arranged to sub-sample chrominance values of one of the set of high dynamic range images into sub-sampled chrominance values of the pixel colors of the one of the set of high dynamic range images;

a first and second spatial upscaler arranged to upscale the sub-sampled chrominance values to a resolution of the luma values of the one of the set of high dynamic range images;

a color convertor arranged to, for each pixel of the one of the set of high dynamic range images, convert the luma values and the upscaled chrominance values of pixel colors of the one of the set of high dynamic range images into a non-linear R'G'B' representation comprising three non-linear R'G'B' color values;

a maximum calculation unit arranged to, for each pixel, output a RGB maximum, wherein the RGB maximum is the maximum of the three non-linear R'G'B' color values;

a luminance mapping unit arranged to receive a luminance mapping function which defines a relationship between luminances or lumas of a corresponding one of the set of low dynamic range images to be encoded as an encoded low dynamic range image and the luminances respectively lumas of one of the set of high dynamic range images being encoded, and arranged to, for each pixel, apply the luminance mapping function to the RGB maximum, yielding an output maximum;

a gain factor calculator arranged to, for each pixel, obtain a gain value by dividing the output maximum by the RGB maximum;

a first and second spatial downscaler arranged to spatially downscale the calculated gain values to a resolution of the sub-sampled chrominance values of the pixel colors of the one of the set of high dynamic range images; and multipliers arranged to, for each pixel, multiply the luma values and sub-sampled chrominance values with the determined respective gain value, the respective gain values for the sub-sampled chrominance values being downscaled gain values, wherein the first and second spatial upscaler are determined to apply a fixed upscaling algorithm which is pre-agreed to be used by all decoders to be supplied with the set of encoded low dynamic range images.

8. A method of video encoding arranged to encode a set of high dynamic range images into encoded images which are a set of encoded low dynamic range images which are in a format wherein pixel colors are represented by luma values and chrominance values, the chrominance values being sub-sampled spatially compared to luma values, the method comprising:

spatially sub-sampling chrominance values of one of the set of high dynamic range images being encoded into sub-sampled chrominance values of the pixel colors of the one of the set of high dynamic range images;

upscaling the sub-sampled chrominance values to a resolution of the luma values of the one of the set of high dynamic range images;

converting, for each pixel of the one of the set of high dynamic range images, the luma values and the upscaled chrominance values of pixel colors of the one of the set of high dynamic range images into a non-linear R'G'B' representation comprising three non-linear R'G'B' color values;

calculating, for each pixel, a RGB maximum, wherein the RGB maximum is the maximum of the three non-linear R'G'B' color values;

receiving a luminance mapping function which defines a relationship between luminances or lumas of the corresponding one of the set of low dynamic range input images to be encoded as an encoded low dynamic range image and the luminances respectively lumas of the one of the set of high dynamic range images being encoded, and, for each pixel, applying the luminance mapping function to the RGB maximum, yielding an output maximum;

calculating, for each pixel, a gain value by dividing the output maximum by the RGB maximum;

spatially downscaling the calculated gain values to a resolution of the sub-sampled chrominance values of the pixel colors of the one of the set of high dynamic range images; and multiplying the luma values and sub-sampled chrominance values with the determined respective gain value, the respective gain values for the chrominance values being downscaled gain values, wherein the upscaling of the sub-sampled chrominance coefficients is performed by a pre-agreed fixed upscaling algorithm which is known to be the same upscaling algorithm which is used in the processing calculating the gain values by all decoders to be supplied with the set of encoded low dynamic range images.

9. A computer program product stored on a non-transitory computer readable medium comprising instructions when run on a processor perform the method of claim 5.

* * * * *